US012640987B1

(12) United States Patent
Sinha et al.

(10) Patent No.: US 12,640,987 B1
(45) Date of Patent: May 26, 2026

(54) DETECTION OF HIDDEN ANOMALIES IN NETWORK DATA

(71) Applicant: Intuit Inc., Mountain View, CA (US)

(72) Inventors: Randhir Sinha, Bangalore (IN); Charu Garg, Bangalore (IN); Mayank Kumar Gupta, Bangalore (IN); Sourabh Agarwal, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/271,707

(22) Filed: Jul. 16, 2025

(51) Int. Cl.
*H04L 41/142* (2022.01)
*H04L 43/16* (2022.01)

(52) U.S. Cl.
CPC ............ *H04L 41/142* (2013.01); *H04L 43/16* (2013.01)

(58) Field of Classification Search
CPC ... H04L 41/41; H04L 63/1425; H04L 41/142; H04L 43/16
See application file for complete search history.

(56) References Cited

U.S. PATENT DOCUMENTS

| | | | | |
|---|---|---|---|---|
| 7,904,956 | B2 * | 3/2011 | Golan ..................... | G06F 21/55 705/52 |
| 10,158,658 | B1 * | 12/2018 | Sharifi Mehr ...... | H04L 63/1425 |
| 10,764,315 | B1 * | 9/2020 | Carroll ................ | H04L 12/4625 |
| 11,914,704 | B2 * | 2/2024 | Dangoor ............ | G06Q 20/4016 |
| 11,997,112 | B1 * | 5/2024 | Sanders .................. | H04L 63/10 |
| 2017/0230406 | A1 * | 8/2017 | Gould ..................... | H04L 63/08 |
| 2025/0233743 | A1 * | 7/2025 | Aldweesh ............. | H04L 63/166 |
| 2025/0301325 | A1 * | 9/2025 | Beaudin ................ | H04W 12/06 |
| 2025/0337742 | A1 * | 10/2025 | Jeffords ............. | H04L 63/1425 |

* cited by examiner

*Primary Examiner* — Umar Cheema
*Assistant Examiner* — Adam A Cooney
(74) *Attorney, Agent, or Firm* — Lathrop GPM LLP

(57) ABSTRACT

A method of identifying a hidden anomaly in a stream of time-series data. The stream of time-series data is parsed into a number of sub-streams. Each sub-stream in the number of sub-streams includes a parameter in a number of parameters. A number of policies are executed on the number of sub-streams. Executing outputs a first set of values in a current time window for each of the number of sub-streams. For the each sub-stream, a corresponding difference determination is generated by comparing, for the each sub-stream, the first set of values in the current time window to a second set of values in a past time window for the each sub-stream. When, for a sub-stream, a difference determination satisfies a threshold, an alert is returned that the hidden anomaly occurred with respect to the parameter for the selected sub-stream.

18 Claims, 6 Drawing Sheets

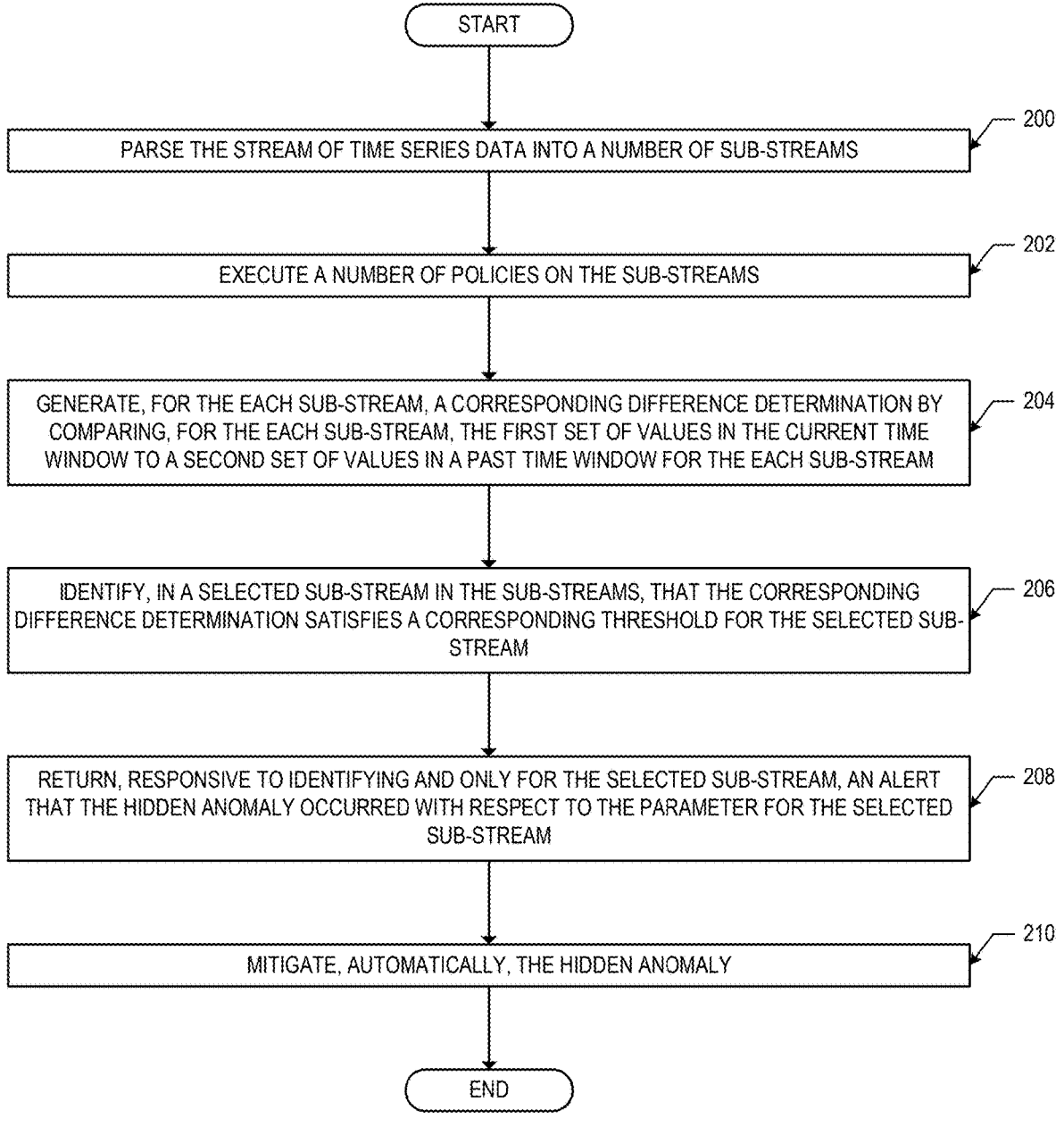

START

PARSE THE STREAM OF TIME SERIES DATA INTO A NUMBER OF SUB-STREAMS — 200

EXECUTE A NUMBER OF POLICIES ON THE SUB-STREAMS — 202

GENERATE, FOR THE EACH SUB-STREAM, A CORRESPONDING DIFFERENCE DETERMINATION BY — 204
COMPARING, FOR THE EACH SUB-STREAM, THE FIRST SET OF VALUES IN THE CURRENT TIME
WINDOW TO A SECOND SET OF VALUES IN A PAST TIME WINDOW FOR THE EACH SUB-STREAM

IDENTIFY, IN A SELECTED SUB-STREAM IN THE SUB-STREAMS, THAT THE CORRESPONDING — 206
DIFFERENCE DETERMINATION SATISFIES A CORRESPONDING THRESHOLD FOR THE SELECTED SUB-
STREAM

RETURN, RESPONSIVE TO IDENTIFYING AND ONLY FOR THE SELECTED SUB-STREAM, AN ALERT — 208
THAT THE HIDDEN ANOMALY OCCURRED WITH RESPECT TO THE PARAMETER FOR THE SELECTED
SUB-STREAM

MITIGATE, AUTOMATICALLY, THE HIDDEN ANOMALY — 210

END

*FIG. 2*

DECISION STREAM T1
410
(DECISION STREAM BY ASSET-ID = 123 FOR TIME T=1)

DECISION STREAM T2
412
(DECISION STREAM BY ASSET-ID = 123 FOR TIME T=2)

408

SERVER CONTROLLER
414

ANOMALY DECISION
416

MITIGATION SERVICE
418

500
COMPUTING
SYSTEM
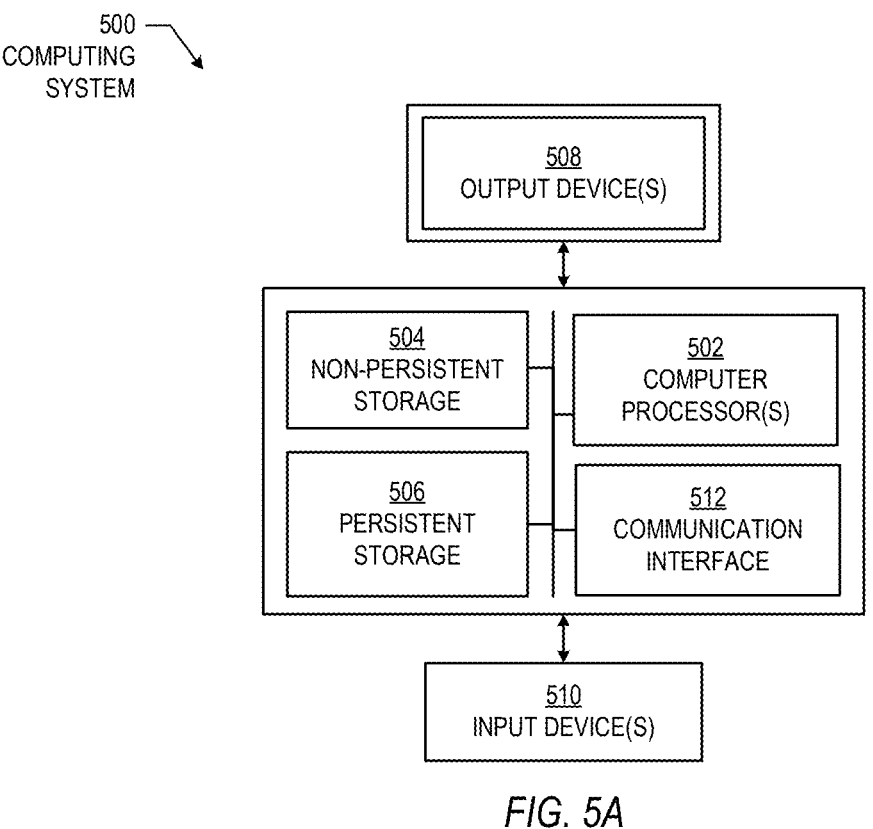
_FIG. 5A_
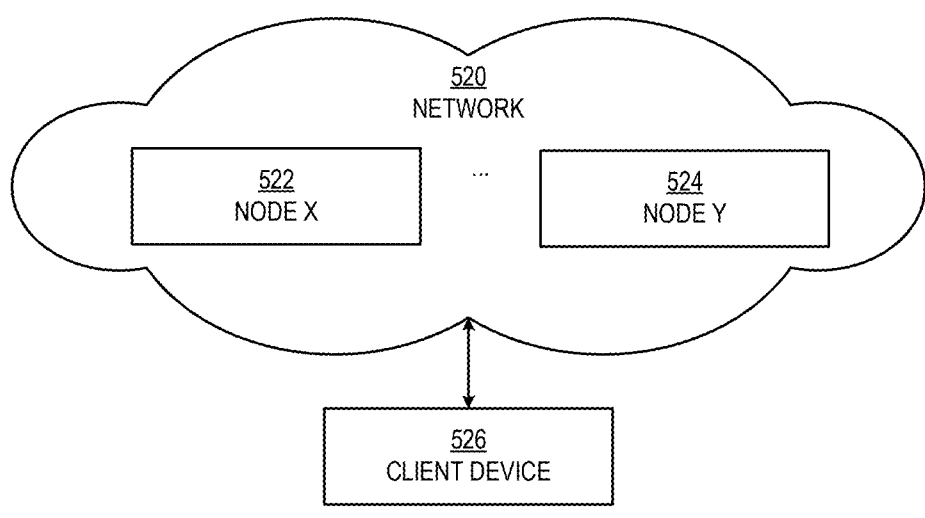
_FIG. 5B_

DETECTION OF HIDDEN ANOMALIES IN NETWORK DATA

BACKGROUND

Modern enterprise systems use many servers, network connections, and software applications to implement industrial-scale computer services. While users of enterprise systems may demand constant availability of the service upon request, maintaining constant, 100% reliability may be difficult or impossible, particularly for large enterprise systems. Therefore, enterprise system owners seek to mitigate downtime for users when outages or denials of service do occur.

For example, consider an online service that provides single sign-on access to dozens of online applications provided by a single provider and used by millions of users. The online service is maintained by thousands of computer scientists and technicians. If a problem develops in the single sign-on service, a problem arises in identifying and mitigating the cause of the problem. The complexity of the enterprise system increases the difficulty of identifying the problem. The problem is increased again when only a small subset of the users encounter a problem, such as when an obsolete policy is applied to the small subset of users at sign-in. As a whole, the problem may go undetected because the anomalous rejections of login requests by the small subset of users are not detected among the vast number of total login requests that are received and processed. Accordingly, the users in the small subset may experience additional frustration and difficulties accessing the online service.

More generally, a technical problem arises with respect to detecting anomalous events in computer networks that process streams of time-series data (e.g., authentication requests and responses over a period time). The technical problem is how to detect anomalies in subsets of the network time-series data when the amount of time-series data in the subsets is much less than the total amount of time-series data generated by the enterprise system. Continuing the specific example above, a technical problem arises regarding how to detect anomalous rejected or allowed authorization attempts for a small subset of users of network-based applications.

SUMMARY

One or more embodiments provide for a method of identifying a hidden anomaly in a stream of time-series data. The method includes parsing the stream of time-series data into a number of sub-streams. The stream of time-series data includes a number of parameters. Each sub-stream in the number of sub-streams includes a parameter in the number of parameters. The method also includes executing a number of policies on the number of sub-streams. Each of the number of sub-streams has a corresponding unique policy or unique policy combination in the number of policies. Executing outputs a first set of values in a current time window for each of the number of sub-streams. The method also includes generating, for the each sub-stream, a corresponding difference determination by comparing, for the each sub-stream, the first set of values in the current time window to a second set of values in a past time window for the each sub-stream. The method also includes identifying, in a selected sub-stream in the number of sub-streams, that the corresponding difference determination satisfies a corresponding threshold for the selected sub-stream. The method also includes returning, responsive to identifying and only for the selected sub-stream, an alert that the hidden anomaly occurred with respect to the parameter for the selected sub-stream.

One or more embodiments provide for a system. The system includes a computer processor and a data repository in communication with the computer processor. The data repository stores a hidden anomaly and a stream of time-series data. The data repository also stores a number of sub-streams of the time-series data. The stream of time-series data further includes a number of parameters and each sub-stream in the number of sub-streams includes a parameter in the number of parameters. The data repository also stores a number of different policies. The data repository also stores a first set of values in a current time window for each of the number of sub-streams. The data repository also stores a second set of values in a past time window for the each sub-stream. The data repository also stores a corresponding difference determination for each sub-stream. The data repository also stores a corresponding threshold for each sub-stream. The system also includes a server controller executable by the computer processor to parse the stream of time-series data into the number of sub-streams. The server controller is also executable to execute the number of different policies on the number of sub-streams. Each of the number of sub-streams has a corresponding unique policy or unique policy combination in the number of policies. Executing outputs the first set of values in the current time window. The server controller is also executable to generate, for the each sub-stream, the corresponding difference determination by comparing, for the each sub-stream, the first set of values in the current time window to the second set of values in the past time window for the each sub-stream. The server controller is also executable to identify, in a selected sub-stream in the number of sub-streams, that the corresponding difference determination satisfies the corresponding threshold for the selected sub-stream. The server controller is also executable to return, responsive to identifying and only for the selected sub-stream, an alert that the hidden anomaly occurred with respect to the parameter for the selected sub-stream.

One or more embodiments provide for a method of mitigating a hidden anomaly in a stream of time-series data. The method includes parsing the stream of time-series data into a number of sub-streams. The stream of time-series data includes a number of parameters. Each sub-stream in the number of sub-streams includes a parameter in the number of parameters. The stream of time-series data further includes permit or deny decisions from authorization attempts to access a number of different computer-executed services. The method also includes executing a number of different policies on the number of sub-streams. Each of the number of sub-streams has a corresponding unique policy or unique policy combination in the number of policies. Executing outputs a first set of permit or deny decisions in a current time window for each of the number of sub-streams. The method also includes generating, for the each sub-stream, a corresponding difference determination by comparing, for the each sub-stream, the first set of values in the current time window to a second set of values in a past time window for the each sub-stream. The second set of values include permit or deny decisions in the past time window. The method also includes identifying, in a selected sub-stream in the number of sub-streams, that the corresponding difference determination satisfies a corresponding threshold for the selected sub-stream. The method also includes returning, responsive to identifying and only for the selected sub-stream, an alert that the hidden anomaly occurred with respect to the parameter for the selected sub-stream. The method also includes identifying a mitigation service specific to the selected sub-stream. The method also includes mitigating the hidden anomaly by calling, by the mitigation service, an escalation policy specific to the selected sub-stream and programmed to mitigate the hidden anomaly.

Other aspects of one or more embodiments will be apparent from the following description and the appended claims.

BRIEF DESCRIPTION OF DRAWINGS

FIG. 2 shows a flowchart of a method for detection of hidden anomalies in network data, in accordance with one or more embodiments.

FIG. 5A and FIG. 5B show a computing system and network environment, in accordance with one or more embodiments.

Like elements in the various figures are denoted by like reference numerals for consistency.

DETAILED DESCRIPTION

Figure 1:
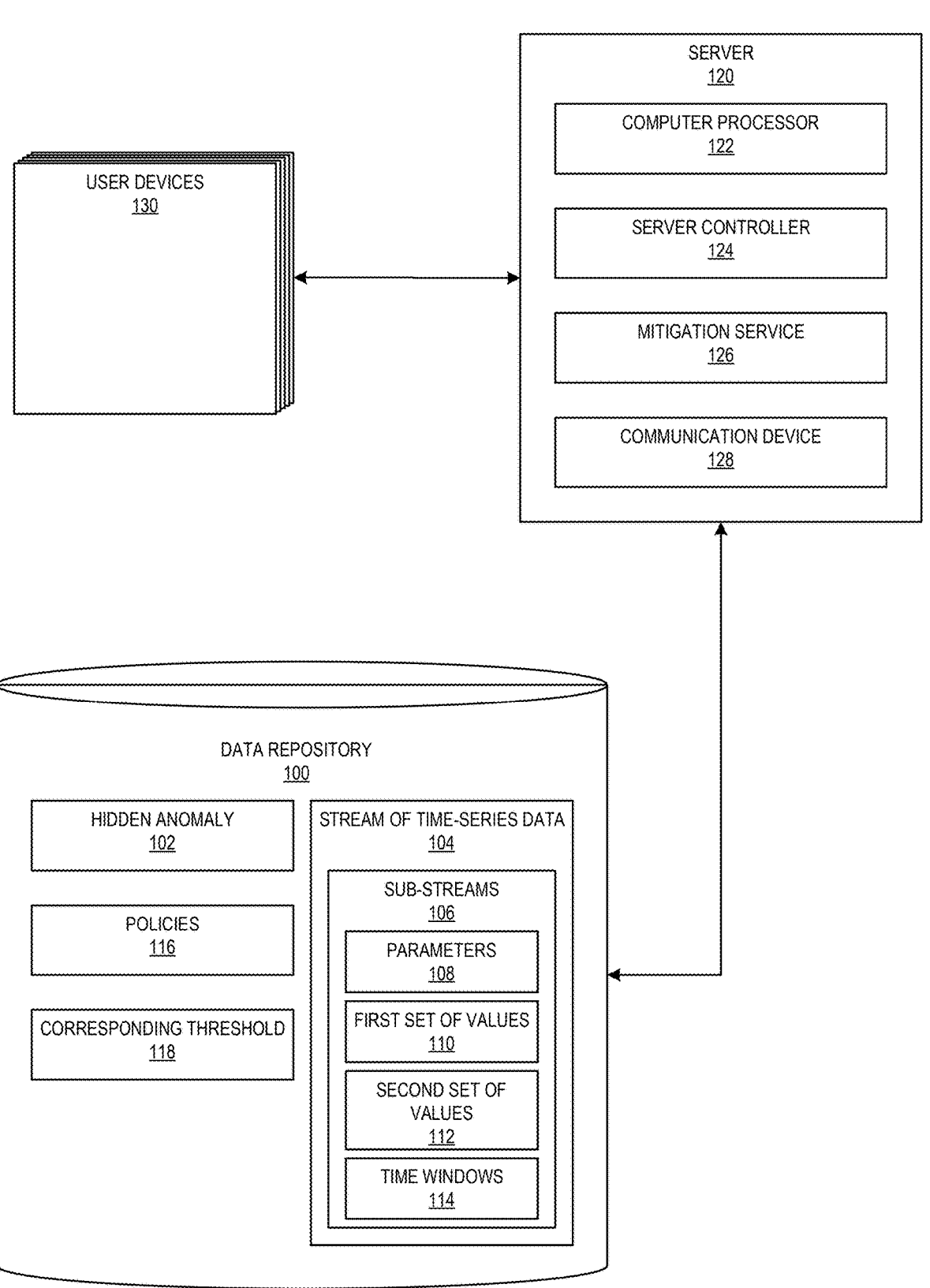
FIG. 1 shows a computing system for detection of hidden anomalies in network data, in accordance with one or more embodiments.

One or more embodiments are directed to technical solutions to the technical problem of how to detect hidden anomalies in subsets of network time-series data when the amount of time-series data in the subsets is much less than the total amount of time-series data generated by the enterprise system. A "hidden anomaly" is an anomaly for an aspect of an enterprise system, where the anomaly is statistically impossible or impractical to detect in the overall number of decisions output by the enterprise system.

Thus, for example, an enterprise system may generate "reject" or "deny" decisions for user requests to access a variety of applications available in the enterprise system. The enterprise system may output, for example, 100,000 authorization decisions per second. In the example, an anomaly may be consistent "deny" decisions for one particular application (among hundreds) in the enterprise system, caused by a failure to update a policy for the application. However, of the 100,000 decisions per second, only 50 decisions relate to the particular application. Thus, an anomaly is present (i.e., too many deny decisions in a time window for the particular application), but the anomaly remains undetected among the 100,000 decisions per second because 50 extra "deny" decisions do not cause a meaningful statistical variation in the total number of "deny" decisions. Thus, the users of the particular application become frustrated while the entity responsible for maintaining the enterprise system remains unaware of the problem (and thus unable to address the policy update).

The technical solution to the above-described technical problem involves splitting the time-series data into multiple sub-streams of the time-series data. Each of the sub-streams represents a portion of the time-series data that is associated with one of (or a combination of) multiple parameters associated with the enterprise system. The parameters represent categories of information, such as an application identifier, an application type, a hypertext transfer protocol (HTTP) status, and others, as described below. The output decisions of interest that are associated with each parameter are monitored in one of the sub-streams. For example, the output decisions of interest may be "permit" or "deny" decisions for log-on authorization requests. In this case, each sub-stream is a series of "permit" or "deny" decisions, associated with a particular parameter, in a predetermined time window.

Each sub-stream may be monitored independently. For the time-series data associated with each parameter, decisions within a current time window are compared to decisions for a comparable prior time window in the same sub-stream. Anomalies for a given sub-stream are recognized when a substantial change occurs between the two time windows. A change is "substantial" when the change exceeds a predetermined numerical threshold.

For example, the number of "permit" decisions or the number of "deny" decisions in a current time window may be compared to the number of "permit" or "deny" decisions in a prior time window. For both time windows, the "permit" or "deny" decisions are associated with a single parameter in the enterprise system. An anomaly is detected, with respect to the parameter, when a change in the number of "permit" or "deny" decisions between the two time windows exceeds a predetermined threshold.

By splitting the time-series data into multiple sub-streams of the time-series data, where each sub-stream is associated with a parameter related to the enterprise system, specific aspects of the enterprise system may be monitored. By combining parameters, fine-grain monitoring of individual groups of users of the enterprise system may be achieved. Thus, hidden anomalies may be detected that otherwise might not be detected among the vast numbers of decisions made by the enterprise system as a whole. Accordingly, one or more embodiments represent a technical solution to the above-described technical problem.

Quickly detecting hidden anomalies is useful. For example, once a hidden anomaly is detected, anomaly mitigation software may be executed to identify and mitigate the cause of the hidden anomaly. Additionally, individual technicians assigned to maintain a specific aspect of the enterprise system may be identified and automatically contacted to inform the technicians that an anomaly has been detected in the specific aspect of the enterprise system. In either or both cases, the mean time to detect (MTTD) and the mean time to solution (MTTS) for hidden anomalies both may be reduced, leading to increased reliability of the enterprise system.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a hidden anomaly (102). The hidden anomaly (102) is an anomaly that occurs in time-series data, but which is hidden or otherwise difficult to detect. The nature of the hidden anomaly (102) depends on the type of system at issue. For example, the system being monitored may be authorization decisions to multiple assets in an enterprise system environment, where each decision is to "permit" or "deny" a request to access a particular asset. In this case, the anomaly may be an instance where too many, or too few, "permit" or "deny" decisions occur within a particular time period, as explained with respect to the examples below. However, if the system being monitored is data network bandwidth measurements, then an anomaly may be a network bandwidth falling below a predetermined data flow rate. Other examples are possible.

The data repository (100) also stores a stream of time-series data (104). The stream of time-series data (104) is a set of data taken over, or within, a time window. For example, the stream of time-series data (104) may be a stream of "permit" or "deny" authorization decisions of an automated enterprise system that grants or denies access to various assets (e.g., computer programs) hosted by the enterprise system. In another example, the stream of time-series data (104) may be bandwidth measurements of a network at particular time intervals. Other examples are possible.

The data repository (100) also stores one or more sub-streams (106). The sub-streams (106) are also streams of time-series data, like the stream of time-series data (104). However, the sub-streams (106) are portions of the stream of time-series data (104) associated with one or more of the parameters (108) (defined below). For example, one of the sub-streams (106) may be "permit" or "deny" authorization decisions associated with one particular asset in an auto-mated enterprise system. In another example, one of the sub-streams (106) may be network bandwidth measure-ments associated with a particular channel of a particular router in a network system. Other examples are possible.

The data repository (100) also stores one or more param-eters (108) associated with the sub-streams (106). A param-eter is a category of data that may be associated with one of the sub-streams (106), or some aspect of the automated enterprise system. The parameter may be associated with one of the sub-streams (106) by way of metadata. For example, each "permit" or "deny" authorization decision may be assigned a metadata tag that associates that decision with Asset-ID=123, meaning that that one particular deci-sion was one (of many) decisions to permit or deny access to "Asset-ID=123." In another example, a network band-width measurement of channel 1 of router 256 may be assigned a metadata tag that identifies that measurement as being from that particular router and channel.

The following are examples of parameters in an authori-zation decision anomaly detection environment. One param-eter may be "app-id," which represents a unique-identifier for the client application or service which requested the authorization decision. The parameter "app_id" also may be referred to as client-asset-alias or asset-id.

Another parameter may be "app_type." The "app_type" may refer to a type of application that generates authoriza-tion decisions, rather than the identity of a specific asset. The application types include, but are not limited to, web appli-cation, mobile application, desktop application, third-party application, or a backend service application.

Another parameter may be "cbt_userid." The "cbt_us-erid" parameter refers to the user-id of the authenticated context used to make the request to the authorized applica-tion programming interface. The parameter may be obtained from the claims based token sent as part of the authorization header.

Another parameter may be "cbt_realmid." The "cbt_realmid" parameter may be a specific type of identifier, as opposed to all possible identifiers, usable to access the enterprise system or a specific application within the enter-prise system. The parameter may be obtained from the claims based token sent as part of the authorization header.

Another parameter may be "subject_namespace." The "subject_namespace" parameter may be the namespace of the subject. The namespace of the subject identifies the type of subject (e.g., an internal company employee or a company customer.)

Another parameter may be "subject_userid." The "sub-ject_userid" parameter may be the user-id of the subject for whom the authorization decision is evaluated. The param-eter may be obtained from the request payload.

Another parameter may be "subject_realmid." The "sub-ject_realmid" parameter may be the identity of the subject for whom the authorization decision is evaluated. The parameter may be obtained from the request payload.

Another parameter may be "is_offline." The "is_offline" parameter is true when a backend service is processing a request on behalf of a subject, without using the subject's authenticated context.

Another parameter may be "resource_id." The "resource_id" parameter may be a unique identifier for the resource type (e.g., a specific type of data), for which an authorization decision is requested.

Another parameter may be "resource_ownerid." The "resource_ownerid" parameter may be the identity of the resource for which the authorization decision is requested.

Another parameter may be "action_id." The "action_id" parameter is an identifier for the action on the resource identified by resource_id. For example, the action "create" and resource "invoice" may be used to request for an authorization decision.

Another parameter may be "http_status." The "http_sta-tus" parameter may be a hypertext transfer protocol (HTTP) response code for the authorizing application programming interface (API) provided by the authorization decision ser-vice. The API may be used to request an authorization decision.

Another parameter may be "event_time." The "event_time" parameter may be the time when the authorization decision was evaluated, down to the millisecond or other precision (i.e., second, microsecond, picosecond, etc.).

Another parameter may be "policy_id." The "policy_id" parameter is a unique identifier for an authorization policy that is evaluated to obtain an authorization decision.

Another parameter may be "has_obligations." The "has_obligations" parameter is true when a "permit" autho-rization decision includes conditions specified as obligations that are to be satisfied by the client before processing the request.

Another parameter may be "has_remediations." The "has_ remediations" parameter is true when a "deny" deci-sion includes stipulations specified as remediations that may be used by a user-experience to demand additional infor-mation from the subject.

Many other parameters are possible. Furthermore, the parameters (108) may be used in combination with each other, as explained with respect to FIG. 2.

The data repository (100) also stores a first set of values (110). The first set of values (110) are numbers or other data output as a result of executing a number of policies (116) (defined below) on the sub-streams (106).

In particular, the first set of values (110) is for a current time window. In other words, the first set of values (110) is the output of the policies (116) (defined below) or machine learning algorithms for the most recent sub-stream or sub-streams (106). As a specific example, the first set of values (110) may be one number that reflects the percentage of "permit" versus "deny" authorization decisions in a current time window for one of the sub-streams (106) related to one or a combination of the parameters (108).

The data repository (100) also stores a second set of values (112). The second set of values (112), like the first set of values (110), are numbers or other data output as a result of executing a number of policies on the sub-streams (106). Each set of policies or machine learning algorithms determine a result for one of the sub-streams (106), thereby generating one of the second set of values (112).

In particular, the second set of values (112) is for a past time window (e.g., for one of the sub-streams (106) in an immediately preceding time window, relative to the current time window for the same sub-stream(s)). In other words, the second set of values (112) is the output of the policies or machine learning algorithms for a previous sub-stream or sub-streams (106) (which may, or may not, be the next most immediate time stream, relative to the current time stream). As a specific example, the second set of values (112) may be one number that reflects the percentage of "permit" versus "deny" authorization decisions in a preceding time window for one of the sub-streams (106) related to one or a combination of the parameters (108), relative to the current time window.

As indicated above, the sub-streams (106) may be divided into time windows (114). A time window is a predetermined amount of time (e.g., a year, a month, a day, a second, a millisecond, a picosecond, etc.). The exact length of a time window depends on the nature of the stream of time-series data (104). In the case of authorization decisions in a major enterprise environment, the time length of each time window may be measured in second intervals or even millisecond intervals.

The sub-streams (106) are either divided into the time windows (114), or are logically separated into the time windows (114). Thus, for example, each sub-stream may have individual time windows saved as a series of files. Alternatively, a sub-stream may be saved in a single file and be composed of multiple time intervals, with each time window indicated by a logical separation or indicator in the file.

The data repository (100) also stores one or more policies (116). The policies (116) are rules or machine learning algorithms that, when executed on the sub-streams (106) and the parameters (108) according to the method of FIG. 2, generate the parameters (108). Each set of policies (116) (defined below) or machine learning algorithms determine a result for one of the sub-streams (106), thereby generating one of the first set of values (110).

The data repository (100) also may store a corresponding threshold (118). The corresponding threshold (118) is a number or value assigned to one of the sub-streams (106). When a current time window (i.e., one of the time windows (114)) is compared to a prior time window (i.e., a preceding one of the time windows (114)), as described with respect to FIG. 2, then a number is generated. The generated number is compared to the corresponding threshold (118) for that particular sub-stream. As described with respect to FIG. 2, if the threshold is satisfied (or not satisfied, depending on implementation), an anomaly may be said to exist with respect to the sub-stream in question.

The system shown in FIG. 1 may include other components. For example, the system shown in FIG. 1 also may include a server (120). The server (120) is one or more computer processors, data repositories, communication devices, and supporting hardware and software. The server (120) may be in a distributed computing environment. The server (120) is configured to execute one or more applications or hardware devices, such as the server controller (124), the mitigation service (126), or the communication device (128). An example of a computer system and network that may form the server (120) is described with respect to FIG. 5A and FIG. 5B.

The server (120) includes a computer processor (122). The computer processor (122) is one or more hardware or virtual processors which may execute computer readable program code that defines one or more applications, such as the server controller (124), the mitigation service (126), or the software that controls the communication device (128). An example of the computer processor (122) is described with respect to the computer processor(s) (502) of FIG. 5A.

The server (120) also may include a server controller (124). The server controller (124) is software or application specific hardware which, when executed by the computer processor (122), controls and coordinates operation of the software or application specific hardware described herein. The server (120) may execute the method of FIG. 2. The server controller (124) also may control and coordinate execution or operation of the mitigation service (126) and the communication device (128).

The system shown in FIG. 1 also may include one or more user devices (130). The user devices (130) are computing systems (e.g., the computing system (500) shown in FIG. 5A) that communicate with the server (120).

The user devices (130) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for detection of hidden anomalies in network data, in accordance with one or more embodiments. The method of FIG. 2 may be implemented using the system of FIG. 1 and one or more of the steps may be performed on or received at one or more computer processors. The method of FIG. 2 may be characterized as a method of identifying a hidden anomaly in a stream of time-series data. The anomaly may be hidden because the anomaly present with respect to a particular asset, software, or other network component may be hidden by an overabundance of data with respect to all of the assets, software, or other network components in an enterprise environment.

Step 200 includes parsing the stream of time-series data into a number of sub-streams. The stream of time-series data includes a number of parameters. Each sub-stream in the number of sub-streams includes a parameter in the number of parameters.

Parsing the time-series data into a number of sub-streams may be performed using different techniques. In one example, metadata tags may be associated with each measured datum in the time-series during a pre-processing step. The metadata tags may associate corresponding parameters with each measured datum. Thus, parsing may include sorting each datum in the time-series into the sub-streams according to the metadata tags. For example, an authorization decision (to grant or deny entry to a network asset) may be associated with an "asset-123" metadata tag if the parameter associated with that particular authorization decision is defined as "asset-123." In this case, the authorization decision in question is assigned to the "asset-123" sub-stream. An example is shown in FIG. 4.

Thus, for example and as shown in FIG. 4, the sub-streams each may be authorization permit or authorization deny determinations for accessing a number of different computer executable services based on the parameters. In this manner, the authorization decisions for each computer executable service may be tracked individually in corresponding sub-streams of the overall authorization decision time-series data.

Step 202 includes executing a number of policies on the number of sub-streams. Each of the number of sub-streams has a corresponding unique policy or unique policy combination in the number of policies. Executing outputs a first set of values in a current time window for each of the number of sub-streams.

Executing the policies depends on the policies. For example, the policy may be to determine the relative percentage of "permit" authorization decisions to "deny" authorization decisions in a given time window. However, in a network bandwidth monitoring environment, the policy may be to measure execute code, to measure the bandwidth of a network, or a portion thereof, at a particular channel of a particular router. Other variations are possible.

In an embodiment, executing may include identifying a selected combination of parameters that correspond to a subset of users of a service that generates the stream of time-series data. For example, the combination may be "app-123" and "user-ID domain=@username.com." In this case, the sub-stream generated may be authorization decisions for application "123" accessed by users having domain names equaling "@username.com." Thus, one or more embodiments contemplate very fine-grained monitoring based on specific combinations of parameters.

For example, one or more embodiments may include adding a user group stream to the number of sub-streams. In this case, the user group stream corresponds to the subset of users. The selected sub-stream thus relates to, for example, authorization decisions for the user group stream. In this case, returning at step 208, below, may include returning the alert only to the subset of users.

Step 204 includes generating, for each sub-stream, a corresponding difference determination by comparing, for each sub-stream, the first set of values in the current time window to a second set of values in a past time window for each sub-stream. The mechanism for generating the difference determination depends on the nature of the data being compared. In the authorization decision example, the difference determination may be to compare the percentage of "permit" decisions in a current time window to a preceding time window (not necessarily the immediately preceding time window). In the network bandwidth example, the difference determination may be the number of times the network bandwidth dipped below a specific number of bytes per second in a specific sub-stream.

Other variations are possible. For example, the current time window and the past time window may be different for each sub-stream. For example, one sub-stream may have a time window measured in seconds, but another sub-stream may have a time window measured in hours. Still other variations are possible.

Step 206 includes identifying, in a selected sub-stream in the number of sub-streams, that the corresponding difference determination satisfies a corresponding threshold for the selected sub-stream. Again, identifying that a difference determination satisfies a threshold depends on the implementation of one or more embodiments.

For example, in the authorization decision example, identifying may include subtracting (or dividing, or some other mathematical function) the "permit" percentage in a current time window to the "permit" percentage in a preceding time window. If the difference exceeds the threshold set for the selected time stream, then an identification is made that the difference determination satisfies a threshold.

In the network bandwidth example, identifying may include comparing an average measured bandwidth in the current time window for a sub-stream to the preceding time window for that sub-stream. If a percentage change between the two windows satisfies a threshold, then an identification is made that the difference determination satisfies the threshold.

The corresponding threshold may be different for at least two of the each of the plurality of sub-streams. Thus, different sub-streams that track different sub-parts of the time-series data based on different parameters may be compared to different threshold values.

Step 208 includes returning, responsive to identifying and only for the selected sub-stream, an alert that the hidden anomaly occurred with respect to the parameter for the selected sub-stream. The alert may be returned by transmitting a command to a mitigation service to mitigate the anomaly. The alert may be returned by transmitting a notification to a human computer scientist or other technician that the service or network component associated with the parameter in question should be checked for proper operation. The alert may be transmitted to other personnel or other automated applications.

The method of claim 1 may terminate at step 208 in some embodiments. However, the method also may include additional steps. For example, the method also may include, at step 208, mitigating, automatically, the hidden anomaly.

Mitigating may include determining a type of the hidden anomaly. In this case, mitigating then includes calling an escalation policy based on a type of the hidden anomaly. The escalation policy may be executed to perform mitigating the hidden anomaly. For example, the escalation policy could be to restart the service or application in question (e.g., the application identified by the parameter), to limit traffic to the service or application, or to shut down the service. The escalation policy could be to perform an anti-virus scan with respect to the service or sub-stream, or to take some other action called for in the escalation policy.

The escalation policy could be to execute a classification machine learning model on the selected sub-stream to classify a cause for the hidden anomaly. Depending on the output of the machine learning model, further action (such as that described above) may be taken with respect to the service or application in question. Similarly, the escalation policy could be to execute a diagnostic algorithm on the program or device that generates the selected sub-stream. In yet another variation, the escalation policy could be to transmit a communication signal to a user device assigned to the selected sub-stream.

Other variations to the method of FIG. 2 are possible. For example, the method may include passing, after identifying but prior to returning, the selected sub-stream to a feedback loop. The feedback loop may require another comparison of two more time windows before carrying out alert or mitigation as described with respect to step 208 or step 210. The feedback loop may check for anomalies in the service or application associated by the sub-stream according to some other diagnostic, such as for example to check for latency at a service or to check for responsiveness of an application or asset.

In an embodiment, the feedback loop may determine that the hidden anomaly corresponds to a detected event. In other words, the double-check may verify the presence of the anomaly. In this case, returning at step 208 or mitigating at step 210 may be further performed responsive to the event detected by the feedback loop.

Still other variations are possible. Thus, while the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

Figure 3:
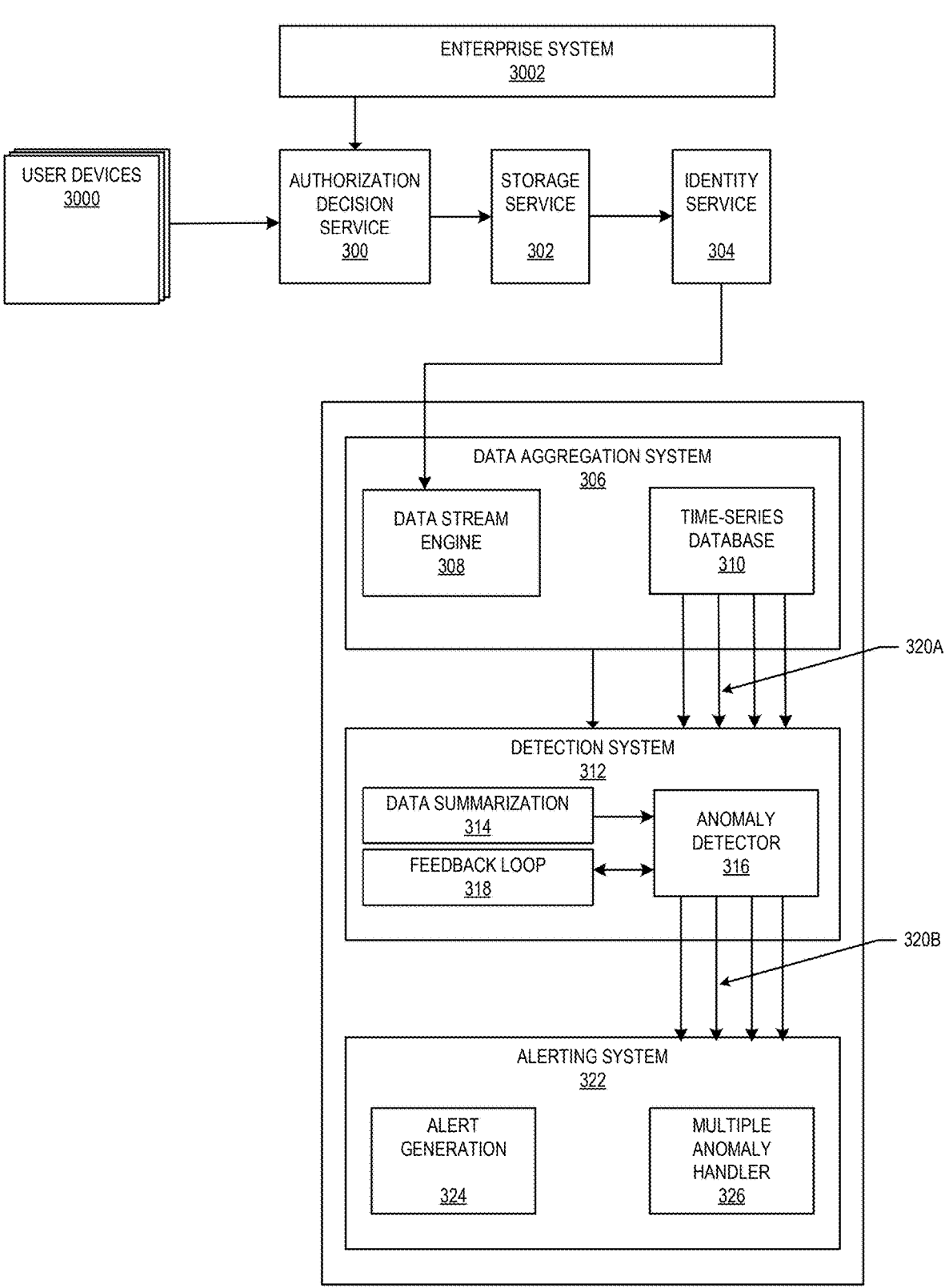
FIG. 3 shows an example of an architecture for a system for detection of hidden anomalies in network data, in accordance with one or more embodiments.
Figure 4A:
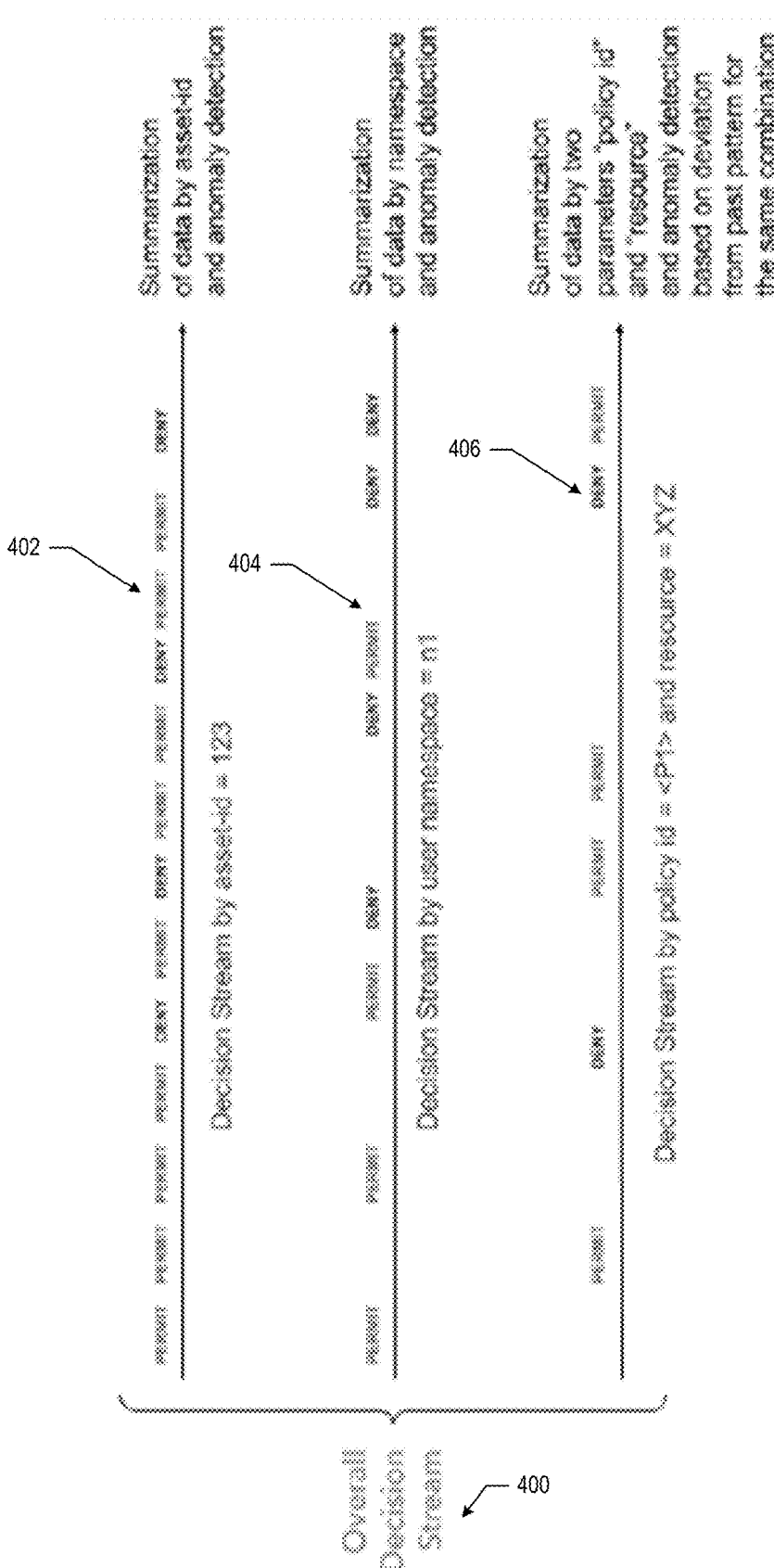
FIG. 4A and FIG. 4B show examples of sub-streams of network data used in the detection of hidden anomalies in network data, in accordance with one or more embodiments.
Figure 4B:
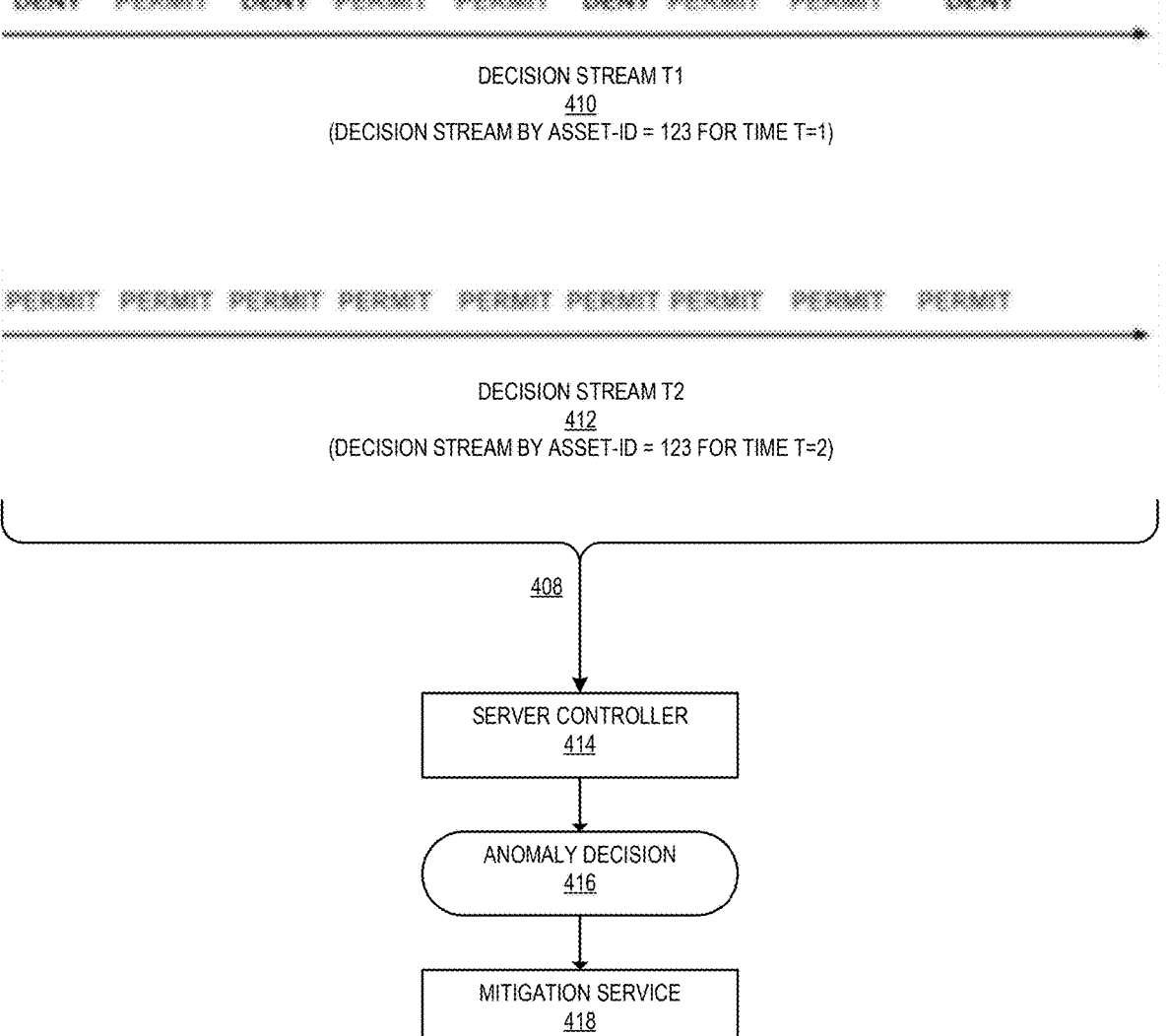

FIG. 3 shows an example of an architecture for a system for detection of hidden anomalies in network data, in accordance with one or more embodiments. FIG. 4A and FIG. 4B show examples of sub-streams of network data used in the detection of hidden anomalies in network data, in accordance with one or more embodiments. FIG. 3, FIG. 4A, and FIG. 4B should be considered together. The example of FIG. 3, FIG. 4A, and FIG. 4B are for explanatory purposes only and not intended to limit the scope of one or more embodiments.

In the example of FIG. 3, multiple user devices (3000) access multiple applications in an enterprise system (3002) via an authorization decision service (300). While the enterprise system (3002) may have many applications, each of the user devices (3000) may have authorization to access only some applications or only some functions of particular applications.

Thus, an authorization decision service (300) determines whether each user device is permitted or denied access to an application when a user access request is received at the authorization decision service (300). Thus, the authorization decision service (300) generates "permit" or "deny" decisions for the enterprise system (3002). The authorization decision service (300) generates a number of such decisions in any given period of time (e.g., 100,000 decisions per second). Accordingly, the authorization decision service (300) generates time-series data. In the example, the time-series data is "permit" or "deny" decisions in a stream of time-stamped decisions.

The time-series data is transmitted to a storage service (302). The storage service (302) stores the time-series data as the time-series data is received.

The stored time-series data is provided to an identity service (304). The identity service (304) grants access to a data aggregation system (306). The data aggregation system (306) includes a data stream engine (308) that pre-processes the time-series data into a time-series database (310). The time-series database (310) stores the time-series data as being associated with particular parameters (e.g., a particular "permit" or "deny" decision is associated with one among multiple parameters). For ease of reference, the time-series database (310) stores pre-processed time-series data in batches known as time windows. Each sub-stream may have its own individually determined time window (i.e., the length of a time window may vary from sub-stream to sub-stream).

Thus, the pre-processed data includes "permit" or "deny" decisions in a predetermined time window for each of multiple different parameters. Each set of "permit" or "deny" decisions associated with a given parameter represents one sub-stream in a set of sub-streams. Accordingly, the time-series database (310) continually stores pre-processed batches (time windows) of data that represent sub-streams (320A) of "permit" or "deny" decisions, each associated with a parameter of the enterprise system (3002).

The pre-processed sub-streams (320A) are provided to a detection system (312). The detection system (312) may include a data summarization (314) system that summarizes each of the sub-streams of data. The data summarization (314) provides for a dynamic and multivariate data summarization, as described below.

Authorization decision data is summarized over a dynamically configured time window ranging from few seconds to minutes. A single or a combination of certain key decision attributes (e.g., client-asset-alias, policy-id, resource-id, subject-namespace, etc.) are used for summarizing a decision stream into permit or deny percentage signals that persisted into the time-series database (310).

When no parameters are used to summarize, then summarization and permit or deny patterns may be aggregated, which may be useful to detect widespread issues in the enterprise system (3002) quickly. When each sub-stream is associated with one parameter (out of probably dozens) then it is possible to narrowly focus on the health of the enterprise system (3002) for that stream.

Using a combination of two or more parameters, it is possible to detect anomalies that may impact a very tiny segment of the enterprise system (3002). The ability to summarize data using a dynamic set of parameters, such as client-asset-alias, policy-id, resource-id, and subject-namespace, allows for fine-grained analysis of authorization decisions. Thus, one or more embodiments provide for a tailored approach to data summarization based on configurable parameters.

The sub-streams of summarized data are provided to an anomaly detector (316). The anomaly detector compares a current time window to a prior time window of the same sub-stream. When the number of permit or deny decisions in the two time windows satisfies a threshold, then an anomaly may be reported for a given sub-stream. However, see below for the feedback loop (318).

Stated differently, scheduled jobs process summary signals against historical summaries, which may span the past several days, weeks, or months. Comparisons are made using a threshold that accounts for traffic variance. If the variance exceeds this threshold, then an anomaly is flagged and persisted into the time-series database (310).

In other words, one or more embodiments compare the latest summary of data against a summary (of a preconfigured interval) within the moving window. Different policies have different request patterns. For instance, some policies may send traffic in the order of 20,000 transactions per second, while some policies might be just sending traffic less than 10 transactions per second. In such cases of varied traffic patterns, a variable threshold that caters to each specific policy is desirable. Accordingly, one or more embodiments store the threshold of a specific set of policies in the time-series database (310). If the differential value is higher than the threshold, the current time window is marked as an anomaly; otherwise, the current time window is not marked as an anomaly.

Utilizing pre-configured thresholds stored in a database for anomaly detection based on different policies' traffic patterns provides for an adaptive threshold approach. The adaptive threshold approach helps the system to accurately detect anomalies even in diverse operating environments.

While the anomaly detector (316) is useful, the anomaly detector (316) may result in false positive anomaly detections (i.e., the enterprise system (3002) is operating normally, but there happens to be an unusual but correct number of "permit" or "deny" decisions). Thus, the detection system (312) also may include a feedback loop (318).

To minimize false positives, one or more embodiments may add extra parameters to confirm or refute the determination of an anomaly. The feedback loop (318) may add more metadata to the streams of data. The metadata may include change request information for policy release, code versions, a list of resolver changes, etc. The feedback loop (318) also may compare the time-series data in each sub-stream against factors like changes in policy, code, or attribute resolvers used for making the downstream calls to enhance detection accuracy and reduce false positives. The resulting reinforced learning improves the reliability of anomaly identification.

If the anomaly detector (316) does not detect anomalies, then no action is taken (i.e., the enterprise system (3002) continues to operate normally). However, in each of the possibly multiple post-processed sub-streams (320B), anomaly decisions are output to an alerting system (322). The alerting system (322) may take one or more actions in response to the detection of an anomaly in a given sub-stream.

For example, the alerting system (322) may include an alert generation (324). The alert generation (324) may transmit alerts to automated anomaly mitigation programs (described below) or to one or more technicians responsible for handling the part of the enterprise system (3002) associated with the parameter assigned to the particular sub-stream in the post-processed sub-streams (320B).

When multiple anomalies are detected in multiple sub-streams, a multiple anomaly handler (326) may coordinate a mitigation response, as described below. Thus, one or more embodiments provide for a multi-tenet system which supports over 100+ applications, each running its own set of policies.

One or more embodiments may store the mappings of the policy, policy owners, policy consumers, policy service, and an escalation policy for the service. Whenever an anomaly is detected, the alerting system (322) fetches the policy name and corresponding escalation policy. A pager duty application programming interface (API) may be invoked. In this API call, a post request may be made with the payload, which has all relevant details. Relevant details may include, for example, the policy for which the anomaly is detected, the type of anomaly, a time window during which the anomaly has occurred, and the escalation policy that needs to be paged.

The pager duty API may fetch the escalation policy name from the payload and page or notify the respective on-call technician or automated mitigation program. Thus, the affected technician team may be paged on time, or the proper anomaly mitigation program executed on a specific aspect of the enterprise system (3002), thereby reducing the mean time to detection and mean time to response when an anomaly occurs.

If there are multiple anomalies detected, then the multiple anomaly handler (326) may send these alerts to the consumers of the affected policies. In one or more embodiments, points of contact may be configured in the time-series database (310). Whenever an anomaly is detected, a payload of the detected anomaly is sent to the pager duty API. This payload contains the type of anomaly (e.g., drift in permit percentage, deny percentage, attribute resolution, time variation, etc.), the time window in which the anomaly happened, and the policy owner or corresponding team who owns and manages the policy.

The pager duty API calls the escalation policy corresponding to the point of contact of the policy present in the API Payload. The escalation policy determines whom to page. This way, only the consumer of the policy for whom the anomaly has been triggered is alerted. Additionally, in one or more embodiments, the applications which call for mitigation are paged for the specific fault caused in their policy, instead of only notifying the platform which manages the policy of all the customers and teams.

Accordingly, one or more embodiments provide for a federated and targeted alerting system. One or more embodiments provide for an advanced alerting mechanism where alerts are sent directly to policy consumers or the specific impacted teams, tailored based on the escalation policies stored for each consumer. Thus, one or more embodiments reduce mean time to detect (MTTD) and ensures that the relevant stakeholders are promptly notified.

FIG. 4A shows an example of multiple sub-streams of time-series data of permit or deny decisions generated by the system shown in FIG. 3. Each sub-stream is associated with a parameter of the enterprise system (3002) shown in FIG. 3.

In FIG. 4A, the overall decision stream (400) is divided into three sub-streams: sub-stream 1 (402), sub-stream 2 (404), and sub-stream 3 (406). Each sub-stream represents a series of "permit" or "deny" decisions of an authorization system. Each sub-stream is associated with a particular policy or combination of policies.

The sub-stream 1 (402) is associated with an asset identification (asset-id) policy. Accordingly, the sub-stream 1 (402) is a summarization of authorization data according to asset-id. When an anomaly occurs in the sub-stream 1 (402), then there is an anomaly in authorization decisions with respect to the asset-id parameter.

The sub-stream 2 (404) is associated with a user namespace policy. Accordingly, the sub-stream 2 (404) is a summarization of authorization data according to user namespace. When an anomaly occurs in the sub-stream 2 (404), then there is an anomaly in authorization decisions with respect to the user namespace parameter.

The sub-stream 3 (406) is associated with a combination of policies; namely, a combination of a policy id and a resource name. Accordingly, the sub-stream 3 (406) is a summarization of authorization data according to a combination of a policy id and a resource name. When an anomaly occurs in the sub-stream 3 (406), then there is an anomaly in authorization decisions with respect to the combination of policy id and resource name parameters.

FIG. 4B shows an example of anomaly detection with respect to one of the sub-streams shown in FIG. 4A. For clarity, anomaly detection for only one of the sub-streams shown in FIG. 4A is shown in FIG. 4B, though a similar procedure may be performed with respect to the remaining sub-streams shown in FIG. 4A.

Thus, FIG. 4B shows decision stream T1 (410), which corresponds to part of the sub-stream 1 (402) shown in the overall decision stream (400) of FIG. 4A. The decision stream T1 (410) is the stream of authorization decisions made in a predetermined time window, T1, which may be, for example, decisions made with respect to Asset-ID=123 for a one second time window (or some other time interval).

In other words, the decision stream T1 (410) shows "permit" or "deny" decisions that were associated with the metadata tag "Asset-ID=123," and which occurred in the time window designated as "T1."

The decision stream T1 (410) is stored. Then, a new time window of authorization determinations are made in a new time window having a similar or the same time interval as the decision stream T1 (410) using the decisions associated with the same metadata tag of "Asset-ID=123"). The new time window is decision stream T2 (412). Thus, the decision stream T2 (412) shows "permit" or "deny" decisions that were associated with the metadata tag "Asset-ID=123," and which occurred in the time window designated as "T2."

To monitor for anomalies in authorization decisions, the number of "permit" or "deny" decisions in the decision stream T1 (410) is compared to the number of "permit" or "deny" decisions in the decision stream T2 (412). Over normal operation, the number of "permit" or "deny" decisions is expected to vary by a predetermined percentage, relative to the total number of "permit" or "deny" decisions in each window. For example, if there are 10 authorization decisions in a first time window, of which four are "deny" decisions, then the relative percentage is 60% "permit" decisions. If there are 20 authorization decisions in a second time window, of which four are "deny" decisions, then the relative percentage is 80% "permit" decisions. When the first and second time windows are compared, there is a 20% difference between the two time windows. The 20% difference may be within a predetermined expected difference for a given time of day, time of month, time of year, etc.—or may be outside that predetermined time difference in some other embodiment.

In the specific example of FIG. 4, the two decisions (408) are compared. The decision stream T1 (410) has a relative percentage of 4/9=44% "deny" rate. The decision stream T2 (412) has a relative percentage of 0/9=00% "deny rate." The relative percentage difference in decisions between the decision stream T1 (410) and the decision stream T2 (412), as determined by a server controller (414) (which may be the server controller (124) of FIG. 1, is 44%–00%=0.44%).

A predetermined anomaly threshold is 25%. Because the relative percentage difference of 44% is greater than the anomaly threshold of 25%, the anomaly decision (416) output by the server controller (414) is that an anomaly has occurred. Therefore, a mitigation service (418) is notified that an anomaly has occurred in authorization decisions that are associated with the "Asset-ID=123." An automated service may, for example, reboot a server assigned to process such assets IDs. The asset in question may be shut down temporarily, in case a cybersecurity breach has occurred and unauthorized actors have gained access to the asset corresponding to Asset-ID=123. Computer scientists or technicians may be notified of the anomaly, and take action accordingly.

In any case, even though the Asset-ID=123 may produce a very small fraction of authorization decisions in an enterprise system including hundreds of more active assets, that particular asset may be monitored for anomalies. Without one or more embodiments, the anomalies would go undetected in the very large overall number of authorization decisions (e.g., hundreds of thousands of authorization decisions). The reason the anomalies otherwise would go undetected is because the relatively small number of anomalous "permit" decision caused by the one asset would have little statistical effect on the total number of authorization decisions. Thus, one or more embodiments permit fine-grained detection of anomalies in specific assets or other operational aspects of an enterprise computing system.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method of identifying a hidden anomaly in a stream of time-series data, the method comprising:
 parsing the stream of time-series data into a plurality of sub-streams, wherein:
  the stream of time-series data comprises a plurality of parameters,
  each sub-stream in the plurality of sub-streams comprises a different subset of parameters in the plurality of parameters, such that each of the plurality of sub-streams is unique relative to others of the plurality of sub-streams, and
  each of the plurality of parameters comprises metadata describing a corresponding unique category of data generated in an automated enterprise system;
 executing a plurality of policies on the plurality of sub-streams, wherein:
  a corresponding unique policy or unique policy combination in the plurality of policies is executed on each of the plurality of sub-streams, relative to other sub-streams in the plurality of sub-streams, and
  executing outputs a first set of values in a current time window for each of the plurality of sub-streams;
 generating, according to the corresponding unique policy or unique policy combination for the each sub-stream, a corresponding difference determination by comparing, for the each sub-stream, the first set of values in the current time window to a second set of values in a past time window for the each sub-stream,
  wherein each time interval between the current time window and the past time window for the each sub-stream is different;
 identifying, in a selected sub-stream in the plurality of sub-streams, that the corresponding difference determination satisfies a corresponding threshold, wherein:
  the corresponding threshold applies to the selected sub-stream, and
  each sub-stream in the plurality of sub-streams, including the corresponding threshold, has a different threshold relative to other sub-streams in the plurality of sub-streams; and
 returning, responsive to identifying and only for the selected sub-stream, an alert that the hidden anomaly occurred with respect to a selected parameter for the selected sub-stream.

2. The method of claim 1, further comprising:
mitigating, automatically, the hidden anomaly.

3. The method of claim 2, wherein mitigating comprises:
determining a type of the hidden anomaly,
calling an escalation policy based on the type of the hidden anomaly, and
executing the escalation policy to perform mitigating the hidden anomaly.

4. The method of claim 2, wherein mitigating comprises one of:
restarting a program or device that generates the selected sub-stream,
stopping the program or device that generates the selected sub-stream,
performing an anti-virus scan on the program or device that generates the selected sub-stream,
executing a classification machine learning model on the selected sub-stream to classify a cause for the hidden anomaly, and
executing a diagnostic algorithm on the program or device that generates the selected sub-stream.

5. The method of claim 1, further comprising:
transmitting a communication signal to a user device assigned to the selected sub-stream.

6. The method of claim 1, wherein the plurality of sub-streams each comprise authorization permit or authorization deny determinations for accessing a plurality of different computer executable services based on the plurality of parameters.

7. The method of claim 1, wherein executing further comprises:
identifying a selected combination of parameters that correspond to a subset of users of a service that generates the stream of time-series data, and
adding a user group stream to the plurality of sub-streams, wherein the user group stream corresponds to the subset of users.

8. The method of claim 7, wherein:
the selected sub-stream comprises the user group stream, and
returning comprises returning the alert only to the subset of users.

9. The method of claim 1, further comprising:
passing, after identifying but prior to returning, the selected sub-stream to a feedback loop; and
determining, by the feedback loop, that the hidden anomaly corresponds to a detected event, wherein
returning is further performed responsive to the detected event.

10. A system comprising:
a computer processor;
a data repository in communication with the computer processor and storing:
a hidden anomaly,
a stream of time-series data,
a plurality of sub-streams of the time-series data, wherein:
the stream of time-series data further comprises a plurality of parameters,
each sub-stream in the plurality of sub-streams comprises a parameter in the plurality of parameters,
each parameter in each sub-stream is a different parameter or a different combination of parameters relative to other sub-streams in the plurality of sub-streams, and each of the plurality of parameters comprises metadata detailing a corresponding unique category of data generated in an automated enterprise system,
a plurality of policies, wherein each of the plurality of policies is different relative to other policies in the plurality of policies,
a first set of values in a current time window for each of the plurality of sub-streams,
a second set of values in a past time window for the each sub-stream,
a corresponding difference determination for each sub-stream, and
a corresponding threshold for each sub-stream,
a server controller executable by the computer processor to:
parse the stream of time-series data into the plurality of sub-streams,
execute the plurality of policies on the plurality of sub-streams, wherein:
each of the plurality of sub-streams has a corresponding unique policy or unique policy combination in the plurality of policies, relative to other sub-streams in the plurality of sub-streams, and
executing outputs the first set of values in the current time window,
generate, according to the corresponding unique policy or unique policy combination for the each sub-stream, the corresponding difference determination by comparing, for the each sub-stream, the first set of values in the current time window to the second set of values in the past time window for the each sub-stream,
wherein each time interval between the current time window and the past time window for the each sub-stream is different,
identify, in a selected sub-stream in the plurality of sub-streams, that the corresponding difference determination satisfies the corresponding threshold, wherein:
the corresponding threshold applies to the selected sub-stream, and
each sub-stream in the plurality of sub-streams, including the corresponding threshold, has a different threshold relative to other sub-streams in the plurality of sub-streams, and
return, responsive to identifying and only for the selected sub-stream, an alert that the hidden anomaly occurred with respect to a selected parameter for the selected sub-stream.

11. The system of claim 10, further comprising:
a mitigation service executable by the computer processor to mitigate, automatically, the hidden anomaly.

12. The system of claim 11, wherein mitigating comprises:
determining a type of the hidden anomaly, and
calling an escalation policy based on the type of the hidden anomaly.

13. The system of claim 11, wherein mitigating comprises one of:
restarting a program or device that generates the selected sub-stream,
stopping the program or device that generates the selected sub-stream,
performing an anti-virus scan on the program or device that generates the selected sub-stream, executing a classification machine learning model on the selected sub-stream to classify a cause for the hidden anomaly, and executing a diagnostic algorithm on the program or device that generates the selected sub-stream.

14. The system of claim 10, further comprising:

a communication device executable by the computer processor to transmit a communication signal to a user device assigned to the selected sub-stream.

15. The system of claim 10, wherein executing further comprises:

identifying a selected combination of parameters that correspond to a subset of users of a service that generates the stream of time-series data, and adding a user group stream to the plurality of sub-streams, wherein the user group stream corresponds to the subset of users.

16. The system of claim 15, wherein:

the selected sub-stream comprises the user group stream, and returning comprises returning the alert only to the subset of users.

17. The system of claim 10, wherein the server controller is further executable by the computer processor to:

pass, after identifying but prior to returning, the selected sub-stream to a feedback loop; and determine, by the feedback loop, that the hidden anomaly corresponds to a detected event, wherein returning is further performed responsive to the detected event.

18. A method of mitigating a hidden anomaly in a stream of time-series data, the method comprising:

parsing the stream of time-series data into a plurality of sub-streams, wherein:

the stream of time-series data comprises a plurality of parameters, each sub-stream in the plurality of sub-streams comprises a different subset of parameters in the plurality of parameters, such that each of the plurality of sub-streams is unique relative to others of the plurality of sub-streams, each of the plurality of parameters comprises metadata detailing a corresponding unique category of data generated in an automated enterprise system, and the stream of time-series data further comprises permit or deny decisions from authorization attempts to access a plurality of different computer-executed services, executing a plurality of policies on the plurality of sub-streams, wherein:

a corresponding unique policy or unique policy combination in the plurality of policies is executed on each of the plurality of sub-streams, relative to other sub-streams in the plurality of sub-streams, and executing outputs a first set of values in a current time window for each of the plurality of sub-streams;

generating, according to the corresponding unique policy or unique policy combination for the each sub-stream, a corresponding difference determination by comparing, for the each sub-stream, the first set of values in the current time window to a second set of values in a past time window for the each sub-stream, wherein each time interval between the current time window and the past time window for the each sub-stream is different;

identifying, in a selected sub-stream in the plurality of sub-streams, that the corresponding difference determination satisfies a corresponding threshold, wherein:

the corresponding threshold applies to the selected sub-stream, and each sub-stream in the plurality of sub-streams, including the corresponding threshold, has a different threshold relative to other sub-streams in the plurality of sub-streams; and returning, responsive to identifying and only for the selected sub-stream, an alert that the hidden anomaly occurred with respect to a selected parameter for the selected sub-stream;

identifying a mitigation service specific to the selected sub-stream, and mitigating the hidden anomaly by calling, by the mitigation service, an escalation policy specific to the selected sub-stream and programmed to mitigate the hidden anomaly.

* * * * *